(12) United States Patent
Bassett

(10) Patent No.: US 12,069,979 B2
(45) Date of Patent: Aug. 27, 2024

(54) ROTATING GROUND DRIVEN HIGH SPEED PRECISION VACUUM PLANTER WITH SEED INJECTION TEETH

(71) Applicant: Dawn Equipment Company, Sycamore, IL (US)

(72) Inventor: Joseph D. Bassett, Sycamore, IL (US)

(73) Assignee: DAWN EQUIPMENT COMPANY, INC., Sycamore, IL (US)

( * ) Notice: Subject to any disclaimer, the term of this patent is extended or adjusted under 35 U.S.C. 154(b) by 458 days.

(21) Appl. No.: 17/111,196

(22) Filed: Dec. 3, 2020

(65) Prior Publication Data

US 2021/0161062 A1    Jun. 3, 2021

Related U.S. Application Data

(60) Provisional application No. 62/943,227, filed on Dec. 3, 2019.

(51) Int. Cl.
| | |
|---|---|
| *A01C 7/00* | (2006.01) |
| *A01C 5/04* | (2006.01) |
| *A01C 7/04* | (2006.01) |
| *A01C 7/08* | (2006.01) |
| *A01C 7/10* | (2006.01) |
| *A01C 7/16* | (2006.01) |
| *A01C 7/20* | (2006.01) |

(52) U.S. Cl.
CPC ............ *A01C 7/002* (2013.01); *A01C 5/04* (2013.01); *A01C 7/044* (2013.01); *A01C 7/081* (2013.01); *A01C 7/105* (2013.01); *A01C 7/16* (2013.01); *A01C 7/20* (2013.01); *A01C 7/203* (2013.01); *A01C 7/208* (2013.01)

(58) Field of Classification Search
CPC .......... A01C 5/04; A01C 7/002; A01C 7/044; A01C 7/081; A01C 7/126; A01C 7/127; A01C 7/16; A01C 7/20
See application file for complete search history.

(56) References Cited

U.S. PATENT DOCUMENTS

| | | | | |
|---|---|---|---|---|
| 4,023,511 A | * | 5/1977 | Newman ................. | A01C 5/045 111/91 |
| 2016/0073575 A1 | * | 3/2016 | Spapperi .................. | A01C 5/04 111/91 |

FOREIGN PATENT DOCUMENTS

| | | | | |
|---|---|---|---|---|
| CN | 108029285 | * | 5/2018 | ............. A01C 5/04 |
| CN | 108243677 | * | 5/2018 | ............. A01C 5/04 |
| CN | 109104947 A | * | 1/2019 | ............ A01C 7/002 |

(Continued)

*Primary Examiner* — Alicia Torres
(74) *Attorney, Agent, or Firm* — Ice Miller LLP; Justin D. Swindells

(57) ABSTRACT

An agricultural seed planter is provided. The agricultural seed planter has a large diameter rotating planting wheel with fingers or teeth spaced around the periphery of the planting wheel. The teeth are positioned so as to achieve a spacing of the seeds when planted in the soil. The teeth have a small dimple in the end and an even smaller hole passing through the entire length. The dimple provides a place for the seed to sit in and the small hole allows positive or negative air pressure to be transmitted to the seed. The negative air pressure creates a vacuum suction that attaches the seed to the teeth, and the positive air pressure releases the seed from the teeth. In an example implementation, the wheel includes many individual mechanical modules that are linked together to form the wheel.

17 Claims, 11 Drawing Sheets

(56) References Cited

FOREIGN PATENT DOCUMENTS

| CN | 109952836 A | * | 7/2019 | ............. | A01C 19/00 |
|----|---|---|---|---|---|
| EP | 0320248 | * | 6/1986 | ............... | A01C 7/04 |
| GB | 2126063 | * | 3/1984 | ............... | A01C 5/04 |
| GB | 2126063 A | * | 3/1984 | ............. | A01C 7/044 |
| WO | WO-2014170767 A1 | * | 10/2014 | ............... | A01C 5/04 |
| WO | WO-2019226746 A1 | * | 11/2019 | ............. | A01C 7/046 |

* cited by examiner

ROTATING GROUND DRIVEN HIGH SPEED PRECISION VACUUM PLANTER WITH SEED INJECTION TEETH

CROSS-REFERENCE TO RELATED APPLICATIONS

This application claims the benefit of and priority to U.S. Provisional Application No. 62/943,227, filed Dec. 3, 2019, which is hereby incorporated by reference herein in its entirety.

TECHNICAL FIELD

The present disclosure relates generally to agricultural equipment, and more specifically, to agricultural seed planters with planting wheels having a plurality of teeth arranged around the periphery of the planting wheels.

BACKGROUND

Ground engaging opener designs for the purpose of placing seed in the soil has remained largely unchanged for the past 50 years. The disk opener has been the prevailing design concept, both in single disk and double disk configurations where there is a rotating blade that runs through the soil at a slight angle to the direction of motion creating a furrow in which the seeds are deposited into. Prior to this design, the runner or shoe-type planter was the dominant design. With shoe-type planters, a stationary shoe would slide through the soil creating a furrow that the seeds into which would be placed. The disk opener was a significant advancement over the shoe planter because the disk opener can be made to operate while doing less tillage to the soil and can cut through plant residue in the field. The disk opener also takes far less pressure to push into the ground and can operate at higher speeds.

Over the last century, a continuous trend towards planting in field conditions with less tillage and soil preparation at ever higher speeds has emerged. Recently trends have seen the increased adoption of heavy cover crops into so-called "no till" planting systems. In these types of agronomic systems, very heavy cover crops are maintained in the field at planting time. These cover crops are beneficial because they prevent weed growth and increase the health of the soil. However, it is much more difficult to achieve a high degree of planter performance in systems where a very thick mat of plant material is present in the area where the cash crop seeds are being planted. This is because the thick mat of cover crop makes it difficult to achieve consistent seed depth and seed to soil contact, which are the most important drivers of the yield of the crop. The gauge wheel systems on vee opener type planters run on top of the mat of residue causing erratic seed depth, and the disk openers themselves have difficulty coping with cutting through the often still green plant material.

SUMMARY

To try to combat problems associated with minimal tilling and uneven or erratic seed depth, more and more automatic controls are added to conventional double disk type planters. These automatic controls can partially make up for the deficiencies of the fundamental planter design. Since vee opener double disk planters fundamentally are more effective where fields are primarily tilled before seeding, the automatic controls are more of a patchwork solution. Furthermore, as more and more complex automatic control is added to the planter, the planter becomes less friendly from an operation and service standpoint for a farmer.

Embodiments of the present disclosure provide a mechanical agricultural seed planter with a different design that does not have the fundamental problems associated with conventional planters. The agricultural seed planter combines functions of a seed meter and a ground opener, which can greatly increase speed of planting seeds in a field. The agricultural seed planter injects seed at consistent depths based on a depth to which each teeth of the agricultural seed planter punctures the soil. Importantly, the seed planter herein is completely and 100% green in that it uses absolutely no fossil fuel or electrical energy to operate and produces zero emissions and requires zero emissions to be moved across a field. In some implementations, it can be pulled or pushed manually by a human or animals along a field to be planted, without the aid of a tractor or other fuel-burning or battery-operated machine. In some implementations, there are no power sources such as batteries or fuel tanks or any other components that are powered by electricity or electrical energy of any kind. Because the seed planter can be moved entirely by humans or animals, no fossil-burning or battery-operated machines are required. This seed planter can be used on any field anywhere in the world, but in particular in areas where there is no easy access to fossil fuels, batteries, or a charging source. And yet the seed planter herein has a seed hopper or chamber that singulates seeds accurately one at a time into the ground at spaced distances and depths just as accurately as a tractor-pulled seed planter with electrically powered components, but without using any energy source except muscle power to move the planter across the field. If the field has a sufficient decline, gravity can be leveraged to move the seed planter in a downward direction along the field without expending human or animal energy.

According to some implementations of the present disclosure, an agricultural seed planter includes a plurality of mechanical modules arranged around a center to form a planting wheel, a frame coupled to the planting wheel, and at least one gauge wheel coupled to the frame. Each of the mechanical modules includes a tooth for injecting a seed into the soil. The tooth includes a hole axial to the length of the tooth. Each of the mechanical modules further includes a pressure generator coupled to the tooth and configured to generate positive or negative pressure to control a position of the seed when the seed is received by the tooth.

According to some implementations of the present disclosure, an agricultural planter includes a plurality of agricultural seed planters. A respective agricultural seed planter in the plurality of agricultural seed planters includes discrete teeth arranged on a periphery of the respective agricultural seed planter. Each of the discrete teeth has a hole axial to a length of the tooth for communicating fluid pressure through the tooth.

According to some implementations of the present disclosure, an agricultural seed planter that singulates seeds, one at a time, into the ground at a predetermined depth and can produce positive and negative air pressure from the traction force of pulling the planter across the ground. The positive and negative pressure can be produced by the compression or extension of a cylinder or bellow-like device. The cylinder or bellow device can be caused to extend and retract by a cam that actuates the device as the planter rotates. The negative pressure can be used to cause the seed to stick to a tooth against gravity, and the positive air pressure can be used to discharge or eject the seed from the tooth and at the same time prevent buildup of soil in the hole in the tooth through which the seed passes. A sensor can detect whether the seed mechanism has a seed or foreign object in the seed area of the tooth. The diameter of the wheel can change so as to alter the distance between the seeds and changes in the seed population.

According to some implementations of the present disclosure, a ground-driven seed planting device has discrete teeth around a periphery of a wheel. Each of the teeth includes an axial through-going hole to allow communication of fluid pressure to keep the seed from falling out or to discharge the seed into the soil.

According to some implementations of the present disclosure, a ground-driven seed planter is arranged in a wheel configuration, and the wheel has numerous similar modular elements allowing multiple configurations and sizes of the planter.

According to some implementations of the present disclosure, a ground-driven planter has teeth that push the seed into the ground and can move a component in and out that fills an area between adjacent teeth so as to form a continuous surface on the outside of the assembly comprising the tooth. The surface is continuous and smooth to allow a ground driver wheel to pass through a chamber containing a seed such that the only place the seed can go to escape the chamber is in a recess at the end of the tip of the tooth. A separate cam profile can cause the arm that fills the space between the tooth to move in and out.

According to some implementations of the present disclosure, a ground-driven planter with teeth around the periphery of a wheel includes one or more wheels in contact with the ground to control depth and/or to reduce the weight of the mechanism on the ground.

According to some implementations of the present disclosure, an agricultural planter includes multiple planter units, each one having a toothed wheel design and means of changing the seeding population by altering the distance between the rows. In other words, instead of adjusting the space between the seeds, which is typically fixed, by adjusting the distance between the rows, the seeding population density can be easily adjusted.

According to some implementations of the present disclosure, an agricultural planting system that changes the spacing between the rows to change the seed population rather than changing the distance between the teeth from which the seeds are discharged into the soil. In an aspect of the design according to the present disclosure, the space between the teeth is fixed and the seeds are discharged at a rate that is proportional to the rotational speed of the wheel. For soybean population, for example, two or three wheels can be linked close together with the teeth slightly offset from one another to have a relatively short distance between adjacent planting rows. The distance between the rows can be adjusted as the planter is moved through the field. According to another aspect, the spacing or distance between the teeth can be adjusted including in real time as the planter is moved across the field. In this aspect, the wheel includes a planar linkage folding mechanism that expands and contracts like a planar folding linkage first proposed by Chuck Hoberman. The linkage arms, which fold radially, are sized and spaced so that the distance between the teeth can be varied to accommodate different seed population requirements, which are well known to those familiar with the agricultural planting art.

BRIEF DESCRIPTION OF THE DRAWINGS

The foregoing and other advantages of the present disclosure will become apparent upon reading the following detailed description and upon reference to the drawings.

Figure 1:
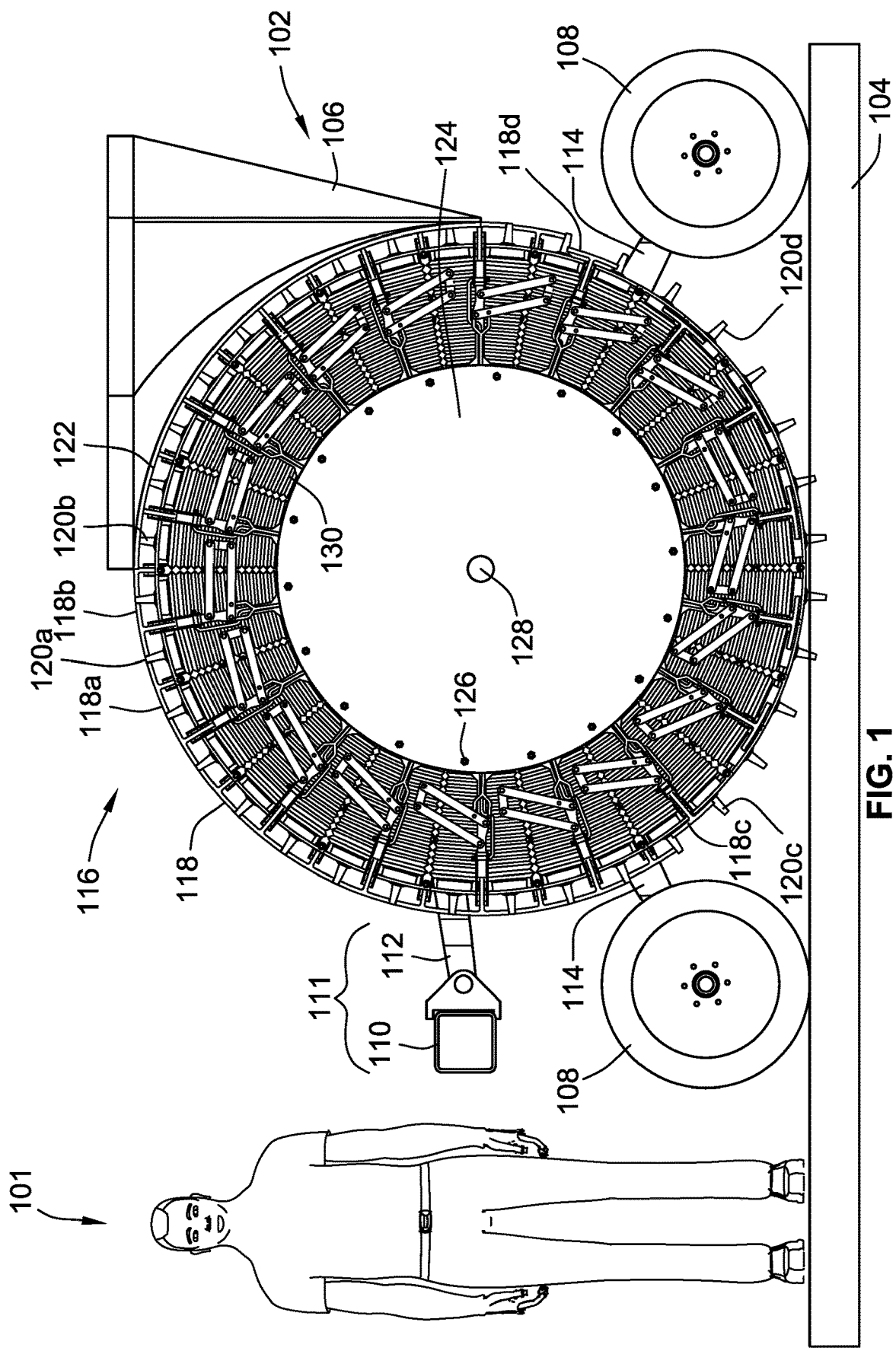
FIG. 1 illustrates a right side view of an agricultural seed planter, according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Embodiments of the present disclosure provide an agricultural planter that can be pulled along farmland by an individual. The planter can automatically plant seeds while being pulled along the farmland. The planter can be attached to an animal (e.g., an ox) or can be attached to a vehicle (e.g., a tractor). The planter can enable sustainable agriculture when an individual is pulling the planter long the farmland because, in some implementations, the planter operates without energy from burning fossil fuels or any other inputted energy apart from the pulling force from the individual. Although pulling is provided herein as an example, in some implementations, a pushing force can be applied to agricultural planters provided in the present disclosure.

Figure 2:
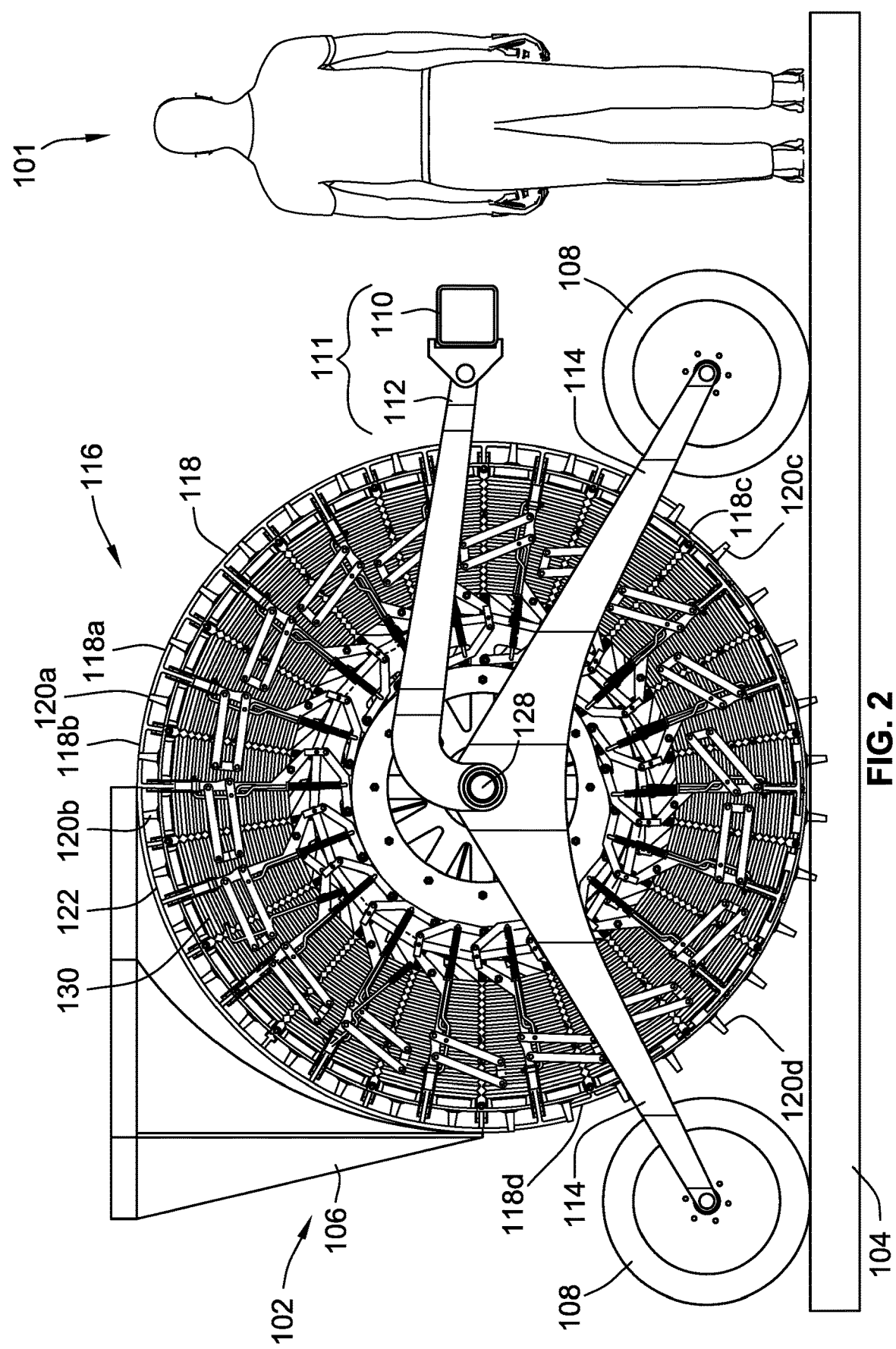
FIG. 2 illustrates a left side view of the agricultural seed planter of FIG. 1, according to some implementations of the present disclosure.

FIG. 1 illustrates an average-sized human person 101 standing next to an agricultural seed planter 102, according to some implementations of the present disclosure. FIG. 1 illustrates a right side view of the agricultural seed planter 102. FIG. 2 illustrates a left side view of the agricultural seed planter 102, according to some implementations of the present disclosure. The following discussion refers to numbered elements in FIGS. 1 and 2. The terms "left side view" and "right side view" are merely used as examples relative to a direction of motion of the agricultural seed planter 102. Although the height of the agricultural seed planter 102 is depicted as being larger than the height of the person 101, in some implementations, both heights are substantially the same or the person 101 is taller than the agricultural seed planter 102. The person 101 and the agricultural seed planter 102 are positioned on soil 104. In some implementations, the overall height of the seed planter 102 can range from about 36 inches to about 96 inches.

The agricultural seed planter 102 includes a planting wheel 116, a seed chamber or hopper 106, a frame 114, and in some implementations, a handle 111 coupled to the frame 114. The handle 111 includes a structural member 112 that couples to the frame 114 and an ergonomic interface 110 that allows the person 101 to pull the agricultural seed planter 102. In some implementations, the ergonomic interface 110 can facilitate connecting the agricultural seed planer 102 to a vehicle or an animal. The seed chamber 106 is also coupled to the frame 114 so that as the agricultural seed planter 102 moves, the seed chamber 106 remains in the same position relative to the position of the frame 114.

In some implementations, the frame 114 is coupled to one or more gauge wheels 108. FIG. 1 shows two gauge wheels 108, a front gauge wheel closer to the person 101 and a rear gauge wheel farther from the person 101. The gauge wheels 108 can be off-center from the planting wheel 116 such that the gauge wheels 108 are not directly in front of the planting wheel 116. This arrangement can be beneficial in the situation where there is only one gauge wheel. In such a situation, the agricultural seed planter 102 still has at least two contact points to the soil 104, enhancing stability of the agricultural seed planter 102. Having two or more contact points to the soil 104 spreads the weight of the agricultural seed planter 102 across the multiple contact points so that the weight of the planting wheel 116 on the soil 104 is reduced at the locations where the planting wheel 116 makes contact with the soil 104. For example, the gauge wheels 108 contact the soil 104, taking off some of the load of the planting wheel 116 on the soil 104. The planting wheel 116 contacts the soil 104 as well, thus, the distributed weight of the planting wheel 116 is shared between the gauge wheels 108 and the planting wheel 116.

The planting wheel 116 includes a plurality of fingers or teeth 120 spaced around a periphery of the planting wheel 116. The teeth 120 are configured to deposit seed in the soil 104 as the planting wheel 116 rotates or travels in a forward motion along the soil 104. In some implementations, the teeth 120 are positioned so as to achieve an optimal spacing of seeds, thus, depending on a desired spacing, the location of the teeth 120 can be adjusted, thus affecting a diameter of the planting wheel 116. The diameter of the planting wheel can range from 36 inches to 96 inches, for example. In some implementations, a smaller diameter planting wheel 116 injects seed with larger separation than a larger diameter planting wheel 116. The planting wheel 116 can include a plurality of pressure generators coupled to the teeth 120. The pressure generators can be cylinders or bellow devices. As examples, two bellow devices 130 are provided in FIGS. 1 and 2 to illustrate a coupling of the bellow devices 130 to teeth 120. For clarity, bellow devices are coupled to each of the teeth 120 in FIGS. 1 and 2, but are not shown for all the teeth 120. The gauge wheels 108 elevate the frame 114 such that a depth of seed injection into the soil is based at least in part on the elevated distance of the frame 114.

While the spacing or distance between the teeth 120 are shown as being fixed, in some implementations, the spacing or distance can be expanded or contracted in real time as the planter 102 is moved across the field. In such implementations, the wheel 116 includes a planar linkage folding mechanism that expands and contracts like a planar folding linkage first proposed by Chuck Hoberman. The linkage arms which fold radially are sized and spaced so that the distance between the teeth can be varied to accommodate different seed population requirements, which are well known to those familiar with the agricultural planting art. An example of constructing a radially foldable planar linkage can be seen in www.sciencedirect.com/science/article/pii/S0020768307000923, whose contents are incorporated herein in their entirety. It will be appreciated that these concepts are already known to the skilled person, so the citation to this article is only to demonstrate awareness in the art as to how to implement the mechanism and applying it to the wheel 116 in the present disclosure.

Figure 3:
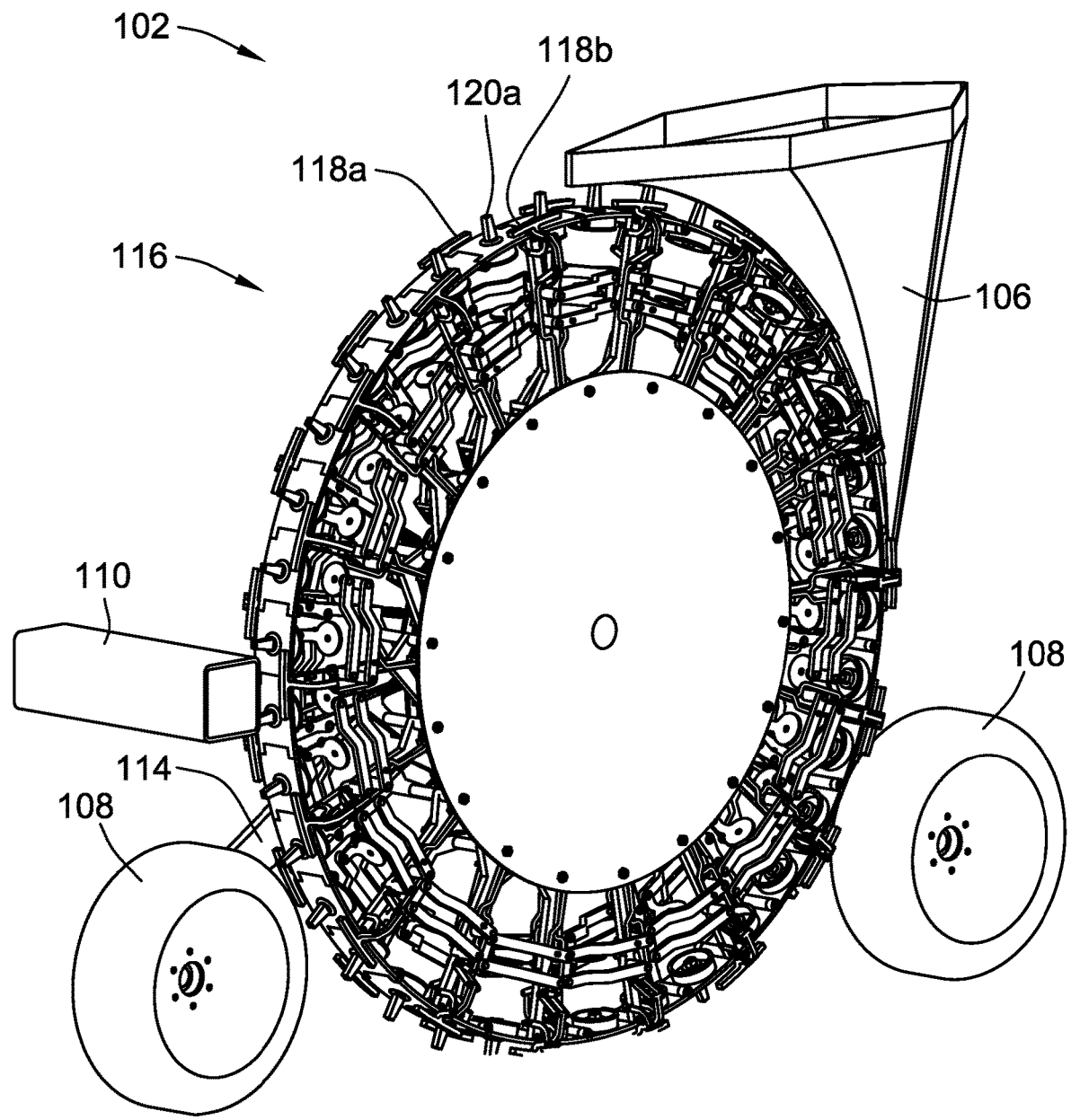
FIG. 3 illustrates a front perspective view of components of the agricultural seed planter of FIG. 1, according to some implementations of the present disclosure.
Figure 4:
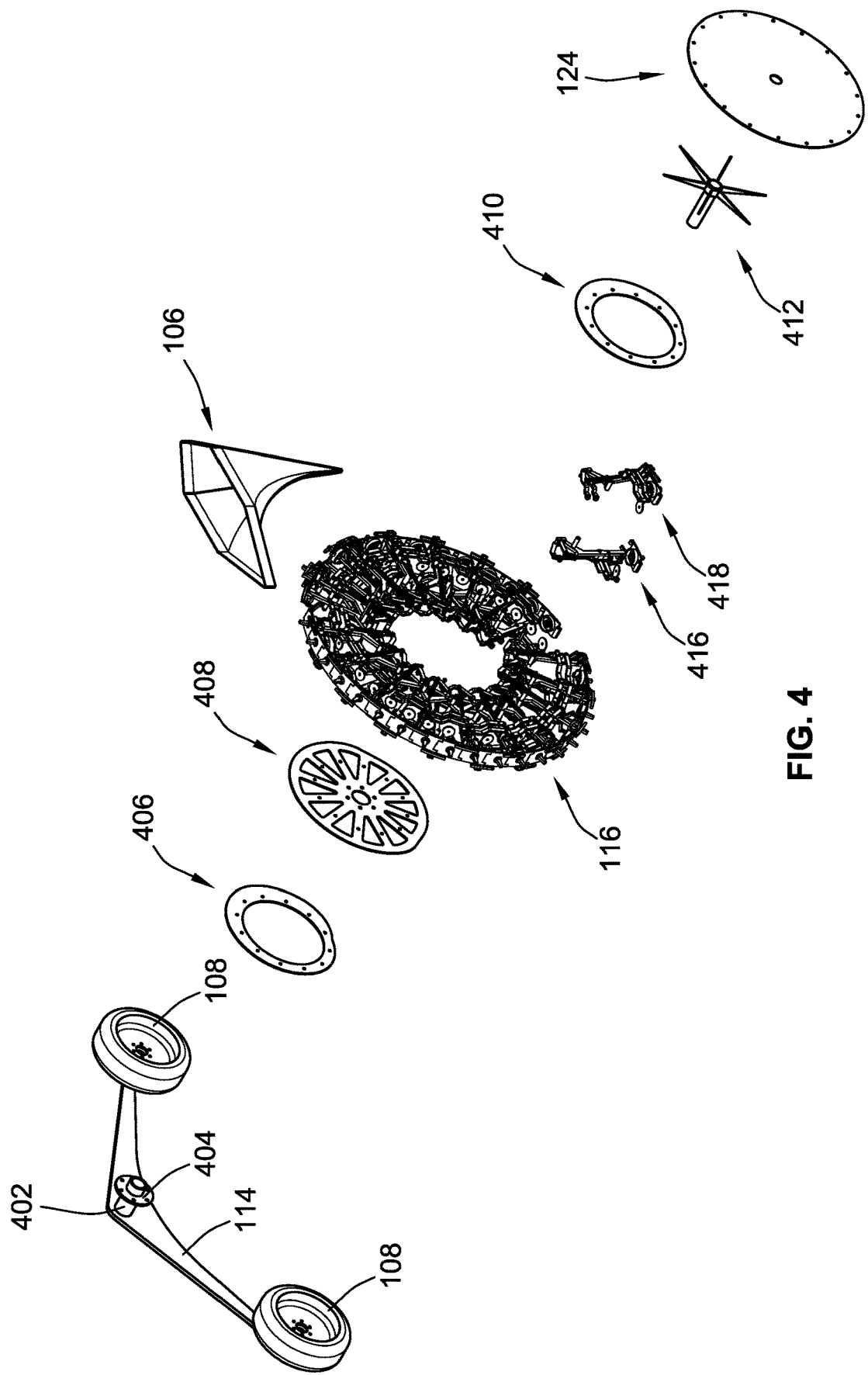
FIG. 4 illustrates an exploded view of the components of the agricultural seed planter of FIG. 1, according to some implementations of the present disclosure.

FIG. 3 illustrates a front perspective view of components of the agricultural seed planter 102, according to some implementations of the present disclosure. FIG. 4 illustrates an exploded view of the components of the agricultural seed planter 102, according to some implementations of the present disclosure. A brief description of the operation of the agricultural seed planter 102 (FIGS. 1 and 2) will be provided using components labeled in FIGS. 1-4. Briefly, the planting wheel 116 (FIG. 1) rotates toward the person 101. As the planting wheel 116 rotates, the teeth portions interfacing with the soil 104 deposit seed into the soil 104. For example, the tooth 120c is moving toward the soil 104 to deposit a seed in the soil 104, and the tooth 120d is moving away from the soil after depositing a seed in the soil 104. The tooth 120d is moving toward the seed chamber 106 to collect another seed. The tooth 120b is depicted as being within the seed chamber 106, and further rotation of the planting wheel 116 will move the tooth 120b out of the seed chamber 106. The tooth 120a is depicted as being outside the seed chamber 106 after exiting the seed chamber 106.

Between each of the teeth 120 there is a retractable tooth filler 118. The retractable tooth filler 118 fills the gap between the teeth 120 so that there is a smooth continuous surface present when the teeth 120 pass through the seed chamber 106 as the planting wheel 116 rotates. For example, the tooth fillers 118a and 118b are flush with the tooth 120a. The tooth filler 118c is shown to be retracting from the tooth 120c as the tooth 120c is moving towards the soil 104. Similarly, the tooth filler 118d is shown to be extending towards the periphery of the planting wheel 116 to create a smooth surface for adjacent teeth 120 prior to the adjacent teeth 120 entering the seed chamber 106. The seed chamber 106 includes guides 122 such that the tooth fillers 118 and the teeth 120 are positioned between the guides 122 when passing through the seed chamber 106. The guides 122 essentially create a track for the teeth 120 and tooth fillers 118 to follow. At any given point, while the planting wheel 116 is in operation, some tooth fillers 118 will be fully extended toward adjacent teeth 120, some tooth fillers 118 will be fully retracted from adjacent teeth 120, and some tooth fillers 118 will be in the process of being extended toward or retracted from adjacent teeth 120. Tooth fillers adjacent to teeth 120 in the seed chamber are fully extended, and tooth fillers adjacent to teeth 120 interfacing the soil 104 are fully retracted.

Referring to FIG. 3, the plurality of teeth 120 are located on a sagittal plane of the planting wheel 116. Each tooth filler 118 that is extended to form the smooth surface is extended from a left side and from a right side. For example, the tooth filler 118a is extended from the right side to the sagittal plane, and the tooth filler 118b is extended from the left side to the sagittal plane, such that when the tooth 120*a* is within the seed chamber 106, the tooth fillers 118*a*, 118*b* and the tooth 120*a* are positioned in the sagittal plane with the tooth fillers 118*a* and 118*b* flush against the tooth 120*a*.

In some implementations, the rear gauge wheel 108 of the two gauge wheels 108 (shown in FIG. 1) acts as a closing wheel, pushing soil down over the top of the seed that has been placed in the indentation made by the teeth 120. In some implementations, the front gauge wheel 108 (shown in FIG. 1) acts as a cover crop crimper. The front gauge wheel 108 can run over or crimp crops or weeds to prepare a portion of the soil 104 right before planting a seed in the area. Attaching the planting wheel 116 to the frame 114 allows vertical movement of the planting wheel 116 over the contour of the soil 104.

In some implementations, the planting wheel 116 is composed of multiple mechanical modules (e.g., mechanical modules 416, 418 of FIG. 4). Referring to FIGS. 1 and 2, The mechanical modules are rigidly connected to a plate 124 at connection points (e.g., connection point 126). The planting wheel 116 rotates about a center 128. A single connection point rigidly connects two mechanical modules to the plate 124. FIG. 4 illustrates an exploded view of the agricultural seed planter 102 showing additional components, according to some implementations of the present disclosure. The frame 114 includes a frame attachment arm 402. The frame attachment arm 402 is connected to a hub 404. The hub 404 allows mounting of the planting wheel 116 (FIG. 3) to the frame 114.

A set of cams 406, 408 and 410 are provided in the agricultural seed planter 102. A first set of cams 406 and 410 control bellow devices (e.g., the bellow device 130 of FIG. 1) provided in the planting wheel 116, and a second set of cams 408 control extending and retracting the tooth fillers 118 (FIG. 3) of the planting wheel 116. The set of cams 406, 408, and 410 are rigidly connected to the hub 404 such that the set of cams 406, 408, and 410 do not rotate while the planting wheel 116 rotates. An axle 412 that attaches to the plate 124 and connects to the frame attachment arm 402 freely rotates. The planting wheel 116 rotates, the plate 124 rotates, and the axle 412 rotates while the frame 114 is moved along the soil 104. The cams 406, 408, and 410 remain stationary with respect to the frame 114 and do not rotate. The cam 408 (the tooth fillers cam) connects to the hub 404, and the cams 406 and 410 (bellow device cams) attach to the cam 408.

Figure 5:
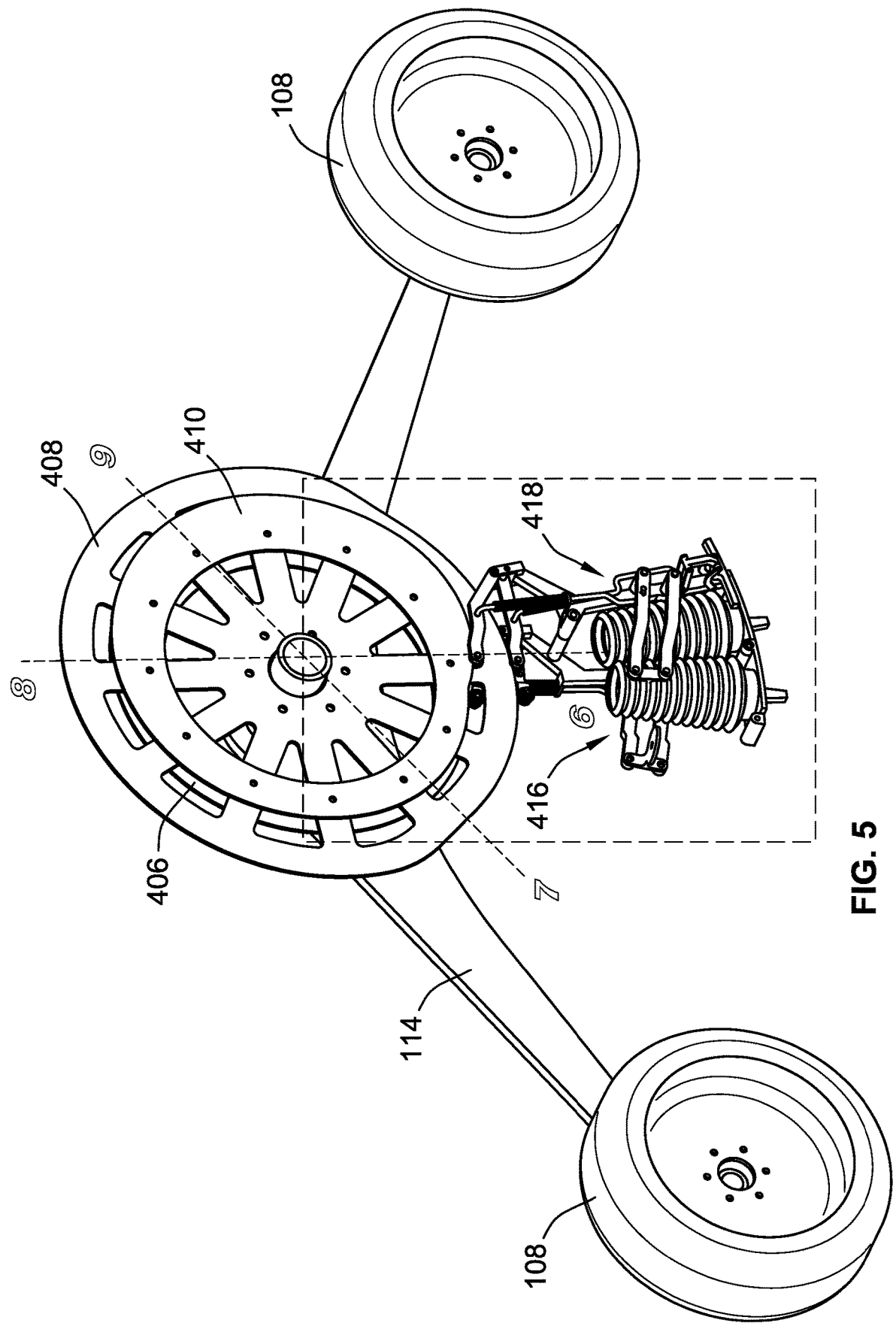
FIG. 5 illustrates two mechanical modules coupled to cams, according to some implementations of the present disclosure.
Figure 6:
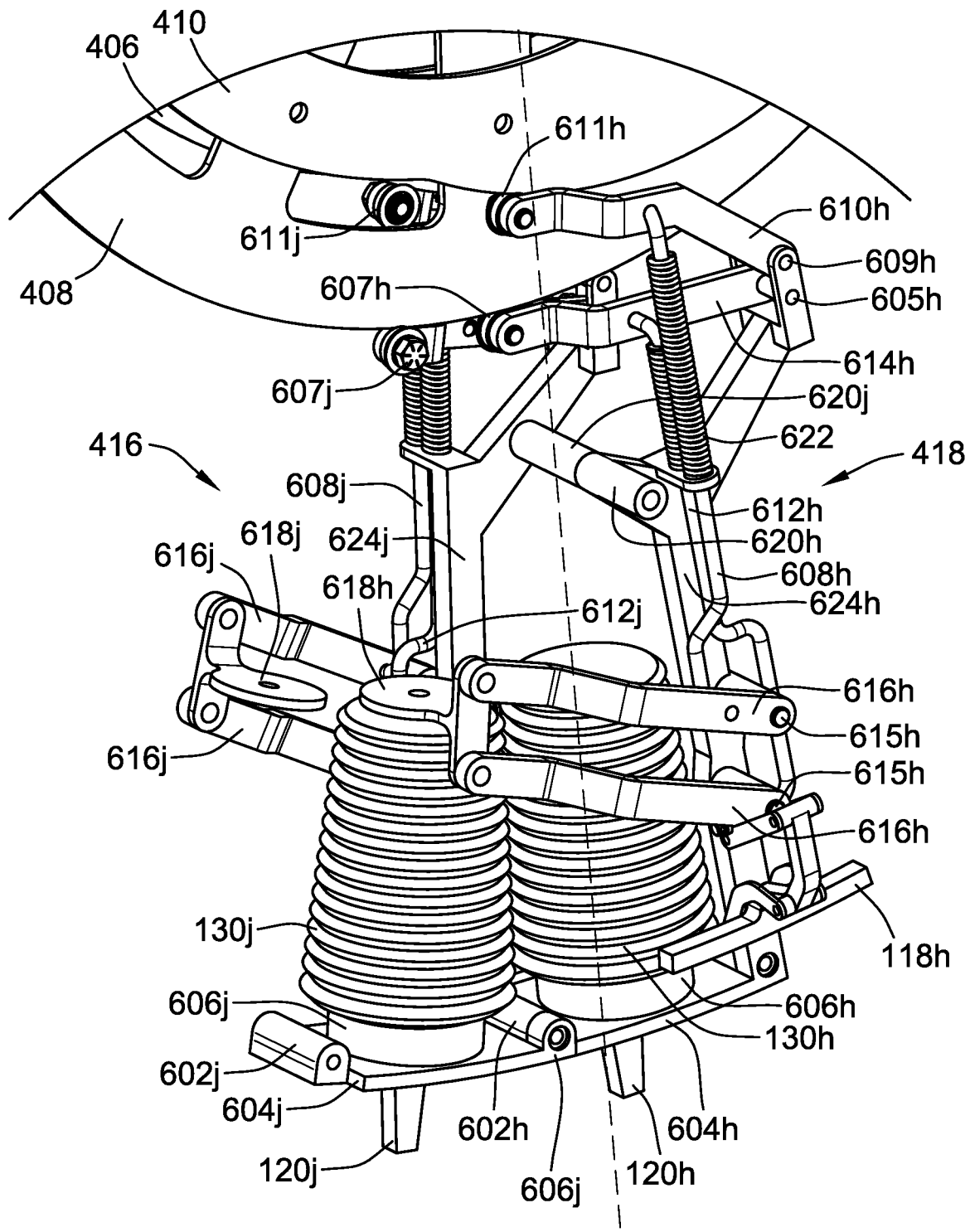
FIG. 6 illustrates the two mechanical modules of FIG. 5 in a first configuration, according to some implementations of the present disclosure.

FIG. 5 illustrates two mechanical modules 416 and 418 coupled to the set of cams 406, 408, and 410, according to some implementations of the present disclosure. FIG. 6 illustrates a zoomed in version of the two mechanical modules 416 and 418 in a first configuration relative to the set of cams 406, 408, and 410, according to some implementations of the present disclosure. Components associated with the mechanical module 416 are labeled with "j" and components associated with the mechanical module 418 are labeled with "h". The mechanical module 416 includes a rigid member 624*j*, and the mechanical module 418 includes a rigid member 624*h*. The rigid member 624*j* and the rigid member 624*h* are linked together at hollow portions 620*j* and 620*h*. The hollow portions 620*j* and 620*h* not only allow linking together the mechanical modules 416 and 418, but also allow liking both mechanical modules 416 and 418 to the plate 124 (FIG. 1), at for example, the connection point 126. Every two mechanical modules share a same connection point to the plate 124 (FIG. 1).

The mechanical modules 416 and 418 have bellow devices 130*j* and 130*h*, respectively, that are coupled to the teeth 120*j* and 120*h*, respectively. The bellow device 130*j* is controlled by the mechanical module 418, and the bellow device 130*h* is controlled by an adjacent mechanical module that is not shown. The mechanical module 416 controls an adjacent bellow device that is not shown.

The mechanical module 418 includes a tooth filler 118*h* that is shown in a retracted position in FIG. 6. The tooth filler 118*h* is connected to the rigid member 624*h* by a linkage that allows the tooth filler 118*h* to be retracted out of the way during the planting wheel 116 (FIG. 1) rotating when the tooth 120*h* is in the area of the soil 104 (FIG. 1). This linkage is connected to a push rod 612*h* that is connected at the other end to another link arm 614*h*. The link arm 614*h* is a tooth filler actuator link that minimizes amount of side load applied to the push rod 612*h* as the planting wheel 116 (FIG. 1) rotates. The link arm 614*h* has at one end a roller or follower device 607*h* and at the other end a pivot point 605*h*. As the planting wheel 116 (FIG. 1) rotates, the follower device 607*h* rolls against the cam 408, resulting in an actuation of the tooth filler 118*h*. The cam is designed to retract the tooth filler 118*h* out of the way as the tooth 120*h* enters the soil 104 (FIG. 1) and to cause the tooth filler 118 to extend before the tooth 120*h* enters the seed chamber 106 (FIG. 1). In some implementations, the link arm 614*h* is biased against the cam 408 with spring pressure. An example of a spring 622 is provided in FIG. 6.

In some implementations, the bellow devices 130*h* and 130*j* are positioned concentric with the teeth 120*h* and 120*j*, respectively. The bellow devices 130*h* and 130*j* allows transmission of positive or negative air pressure to the teeth 120*h* and 120*j*. For simplicity and clarity in description, the bellow device 130*j* is referred to here, but a similar description can be provided for the bellow device 130*h*. The bellow device 130*j* on one end is connected to the tooth 120*j*. The interface 606 provides a structure for the bellow device 130*j* to be secured to the rigid member 624*j* such that the positive or negative air pressure can be communicated to the tooth 120*j*. The rigid member 624*j* includes a curved member 604*j* and a portion 602*j* for interlocking with an adjacent mechanical module (not shown).

The bellow device 130*j* is controlled by the mechanical module 418. The bellow device 130*j* is connected to a bellow actuation linkage 616*h*. The linkage 616*h* allows the bellow device 130*j* to be compressed and decompressed with approximately linear motion. A flat portion 618*h* connected to the linkage 616*h* compresses and decompresses the bellow device 130*j*, preventing the bellow device 130*j* from pinching. The linkage 616*h* pivots about the rigid member 624*h* at pivot points 615*h*. Although the linkage 616*h* includes two different arms with two pivot points 615*h*, in some implementations, the linkage 616*h* can include one or more pivot points 615 with one or more respective arms. In some implementations, an air cylinder can be used in place of the bellow device 130*j*. The bellow actuation linkage 616*h* is connected to an actuation rod 608*h*, which is then connected to another actuation link 610*h*. The actuation link 610*h* includes a roller follower device 611*h* at one end and the other end having a pivot point 609*h*. This follower device 611*h* rolls against the cam 410.

As the planting wheel 116 (FIG. 1) rotates the cam 410 causes the bellow device 130*h* to begin retracting and causing air to be sucked into the tooth 120*j*, right as the tooth 120*j* is entering the seed chamber 106 (FIG. 1). The bellow device 130*j* continues to retract aggressively as the tooth 120*j* passes through the seed chamber 106 (FIG. 1), causing a seed to get sucked onto the tooth 120*j*. As the tooth 120*j* passes out of the seed chamber 106 (FIG. 1) the bellow device 130j continues to retract at a slower rate so as to hold the seed in the end of the tooth 120j.

The continuous negative pressure from the bellow device 130j continues until the tooth 120j is just about to reach the maximum bottom point where the tooth 120j is deepest in the soil 104 (FIG. 1). The negative pressure keeps the seed from falling out of the tooth 120j due to gravity as the wheel 116 is turning. At this point a sharp change in curvature of the cam 410 causes the bellow device 130j to compress rapidly. Compressing the bellow device 130j generates positive air pressure that releases or ejects the seed into the soil at approximately bottom dead center and prevents soil buildup on the tooth 120j. The bellow device 130j then continues to be compressed at a slower rate to maintain airflow out of the tooth 120j as the tooth 120j exits the soil 104. The maintained airflow out of the tooth 120j prevents soil buildup or prevents soil from becoming packed into the end of the tooth 120j. The idea here is that continuous negative pressure holds the seed in place once it has left the seed chamber in opposition to gravity and centrifugal forces that want to dislodge the seed from the tooth until the seed is in position at approximately bottom dead center relative to earth to be discharged into the soil, at which the positive pressure is automatically employed to eject the seed at a depth into the soil.

The curved member 604j provides a larger surface area compared to the tooth 120j so that in some implementations, the curved member 604j rests upon the soil 104 (FIG. 1) or contours the field while the tooth 120j is in soil 104. For example, in FIG. 1, two bottom-most teeth (not shown) are not visible because the teeth are within the soil 104. The two bottom-most teeth may not be visible, but the circular shape of the planting wheel 116 is visible because curved members (e.g., the curved member 604j) contour surface of the soil 104 when in contact with the soil 104.

The mechanical module 416 has similar components to the mechanical module 418. In some implementations, the mechanical module 418 is substantially a mirror image of the mechanical module 416 when viewed from the sagittal plane of the planting wheel 116. Both the mechanical modules 416 and 418 share the same cam 408 for actuating tooth fillers 118h and 118j (see FIG. 7). The mechanical module 418 uses the cam 410 for actuating the neighboring bellow device 130j, and the mechanical module 416 uses the cam 406 for actuating a neighboring bellow device which is not shown. The linkage 616j, the flat portion 618j of the linkage 616j, etc., perform similar functions as those described for the linkage 616h, the flat portion 618h of the linkage 616h, etc. Using the directional convention of FIGS. 1-3, the mechanical module 418 is on the right side of the sagittal plane of the planting wheel 116, and the mechanical module 416 is on the left side of the sagittal plane of the planting wheel 116. That is, the mechanical module 416 is positioned closer to the frame 114 (FIG. 1) when compared to the mechanical module 418.

FIG. 6 illustrates the two mechanical modules 416 and 418 and the cams 406, 408, and 410 in the first configuration. In some implementations, the first configuration denotes a full retraction or close to a full retraction the bellow devices 130h and 130j. That is, the teeth 120h and 120j are ready or close to being ready to inject seed into the soil 104. The teeth 120h and 120j are likely within the soil 104 for the seed injection.

Figure 7:
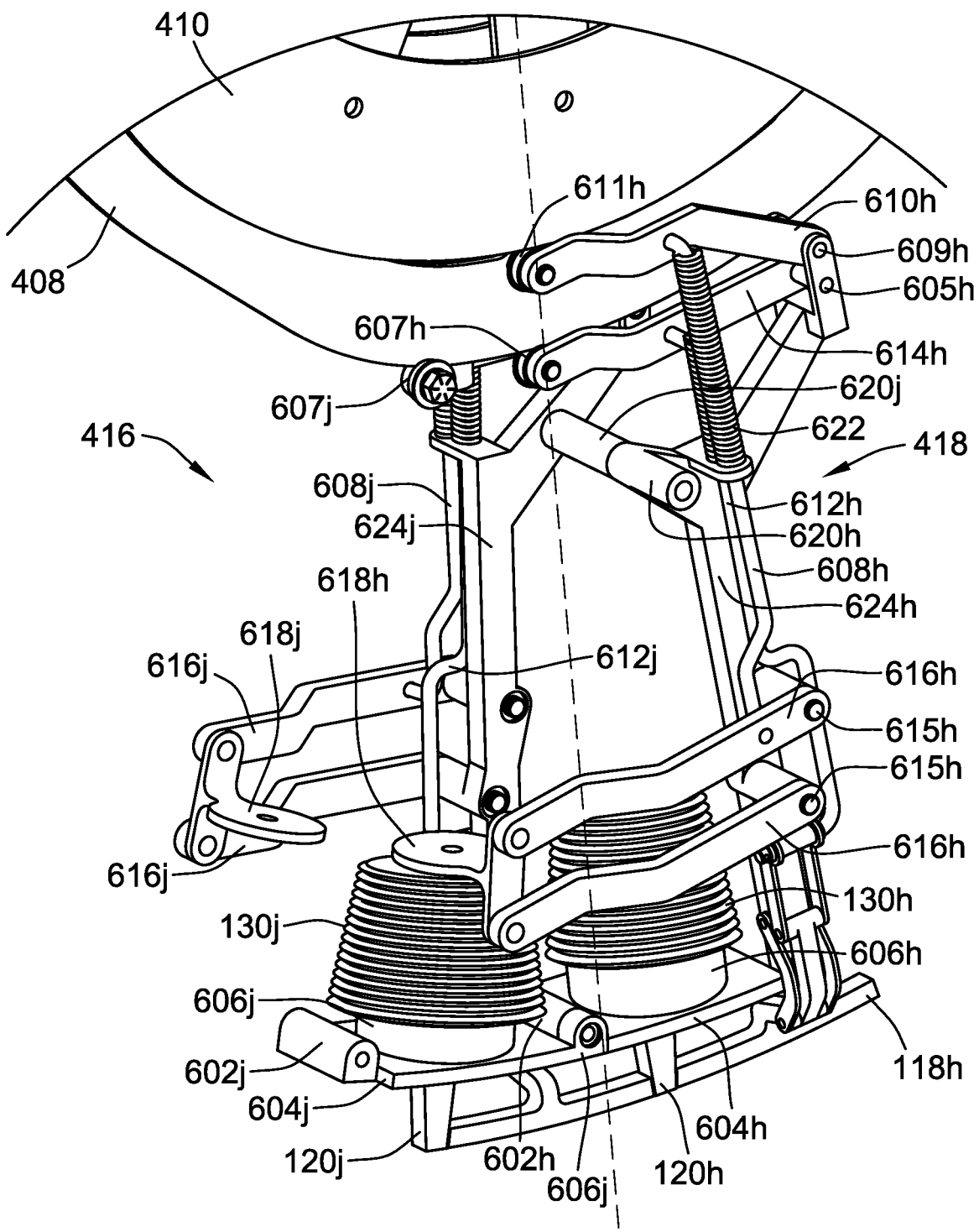
FIG. 7 illustrates the mechanical modules of FIG. 5 in a second configuration, according to some implementations of the present disclosure.

FIG. 7 illustrates the mechanical modules 416 and 418 in a second configuration, according to some implementations of the present disclosure. In some implementations, the second configuration denotes a full compression or near full compression of the bellow devices 130h and 130j. The tooth fillers 118h and 118j are fully extended. In some implementations, the second configuration indicates that the teeth 120h and 120j are close to being received in the seed chamber 106 (FIG. 1).

Figure 8:
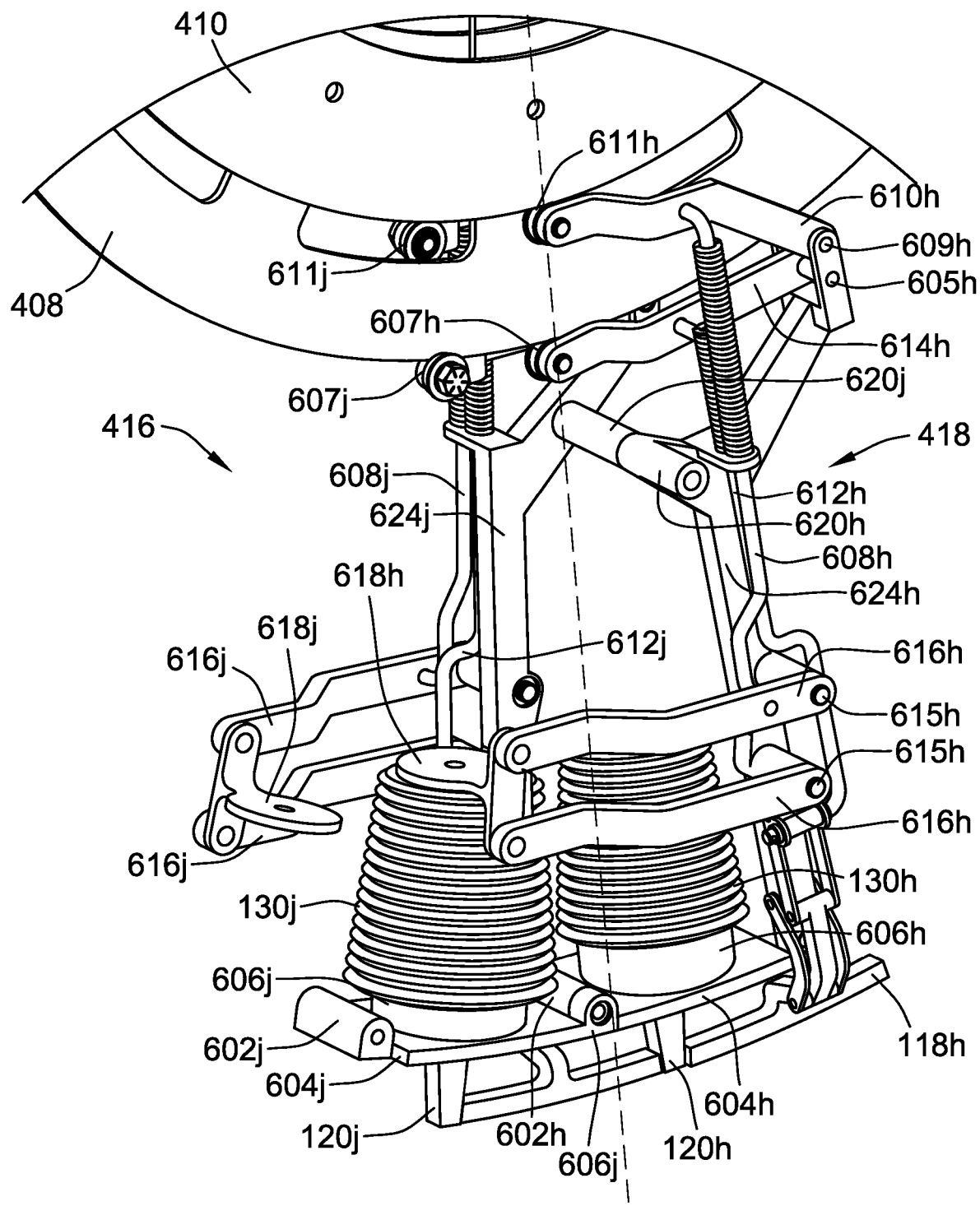
FIG. 8 illustrates the mechanical modules of FIG. 5 in a third configuration, according to some implementations of the present disclosure.

FIG. 8 illustrates the mechanical modules 416 and 418 in a third configuration, according to some implementations of the present disclosure. The third configuration indicates an intermediate position of the bellow devices 130h and 130j. The third configuration can indicate that the bellow devices 130h and 130j are being retracted to maintain a negative pressure that holds seeds in the teeth 120h and 120j in place. The tooth fillers 118h and 118j are fully extended. The third configuration indicates that the teeth 120h and 120j can be within the seed chamber 106 (FIG. 1), about in a similar position as the position where the tooth 120a is depicted in FIG. 1, or another position prior to the position where the tooth 120c is depicted in FIG. 1.

Figure 9:
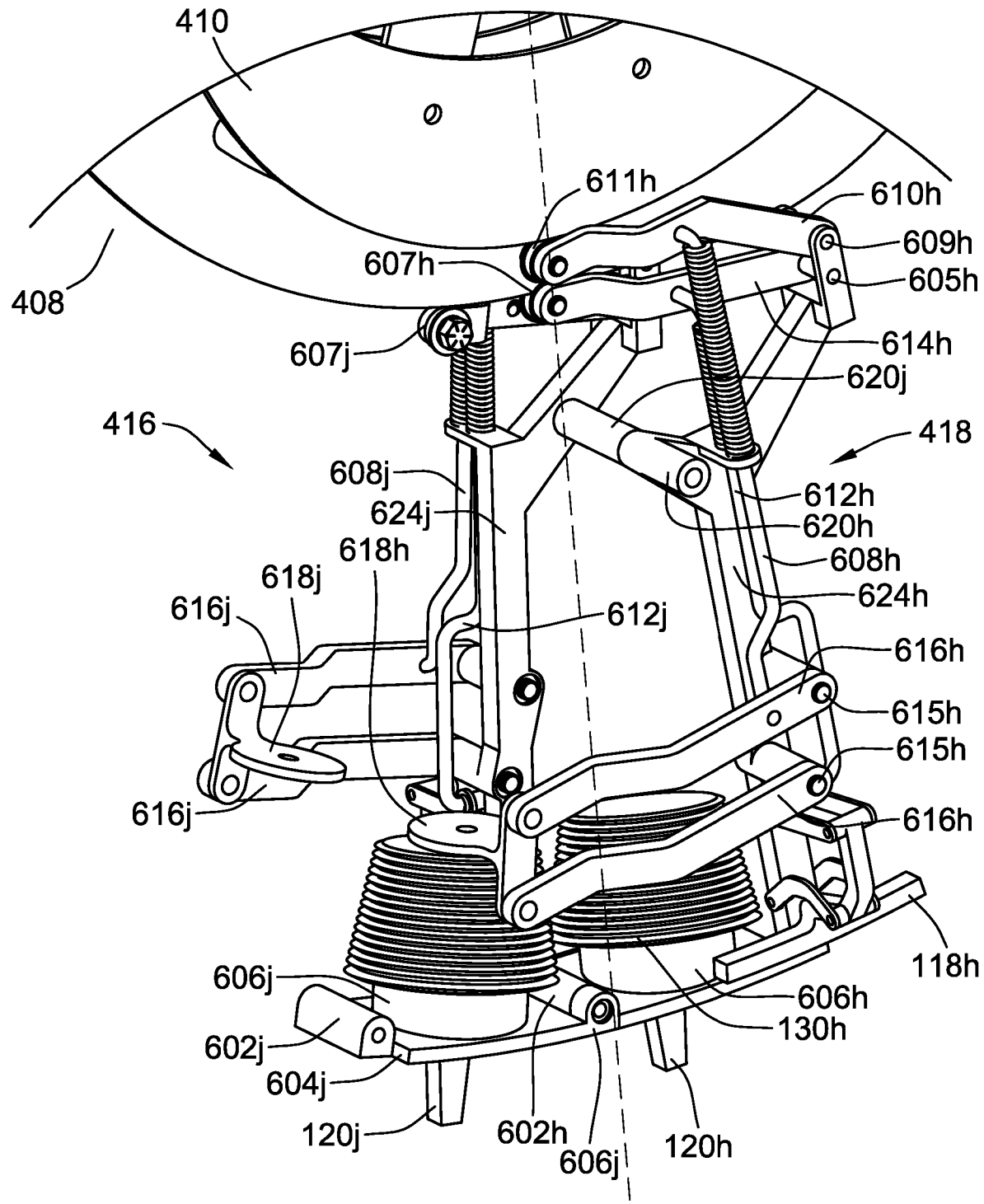
FIG. 9 illustrates the mechanical modules of FIG. 5 in a fourth configuration, according to some implementations of the present disclosure.

FIG. 9 illustrates the mechanical modules 416 and 418 in a fourth configuration, according to some implementations of the present disclosure. The fourth configuration indicates an intermediate position of the bellow devices 130h and 130j. Since the tooth fillers 118h and 118j are retracted, the fourth configuration can indicate that the teeth 120h and 120j are in a position similar to the position of the tooth 120d depicted in FIG. 1.

Referring back to FIG. 1, the bellow devices 130 allow providing either a positive or a negative air pressure communicated through the teeth 120. The cycle where positive air pressure is provided is shorter than the cycle where negative air pressure is provided. For example, for a respective tooth 120, negative air pressure is communicated through the tooth from right before the tooth enters the seed chamber 106 until right before the tooth is in position to inject the seed into the soil 104. In the indicated positions on FIG. 1, the teeth 120a, 120b and 120c all communicate negative air pressure to keep seed in place. The negative air pressure produces a vacuum suction that keeps the seed in place relative to the tooth 120. The tooth 120d communicates positive air pressure while its respective bellow device 130 is being compressed in preparation for entering the seed chamber 106.

Therefore, the cams 410 and 406 have irregular shapes (e.g., ovoid) and are not circular. The cams 410 and 406 provide a show retraction of bellow devices 130 to maintain the negative air pressure for a longer time period when compared to the positive air pressure. The positive air pressure is used to inject seed into the soil 104 and also prevent soil buildup while the teeth 120 leaves the soil 104. The air being released from the teeth 120 prevent soil from building up at the tips of the teeth 120. In some implementations, a series of brushes can be positioned to clean soil off of the teeth before entering the seed chamber 106. In some implementations, the series of brushes can be driven so that the brushes rotate so enhance cleaning the teeth 120 before the teeth 120 enter into the seed chamber.

Figure 10:
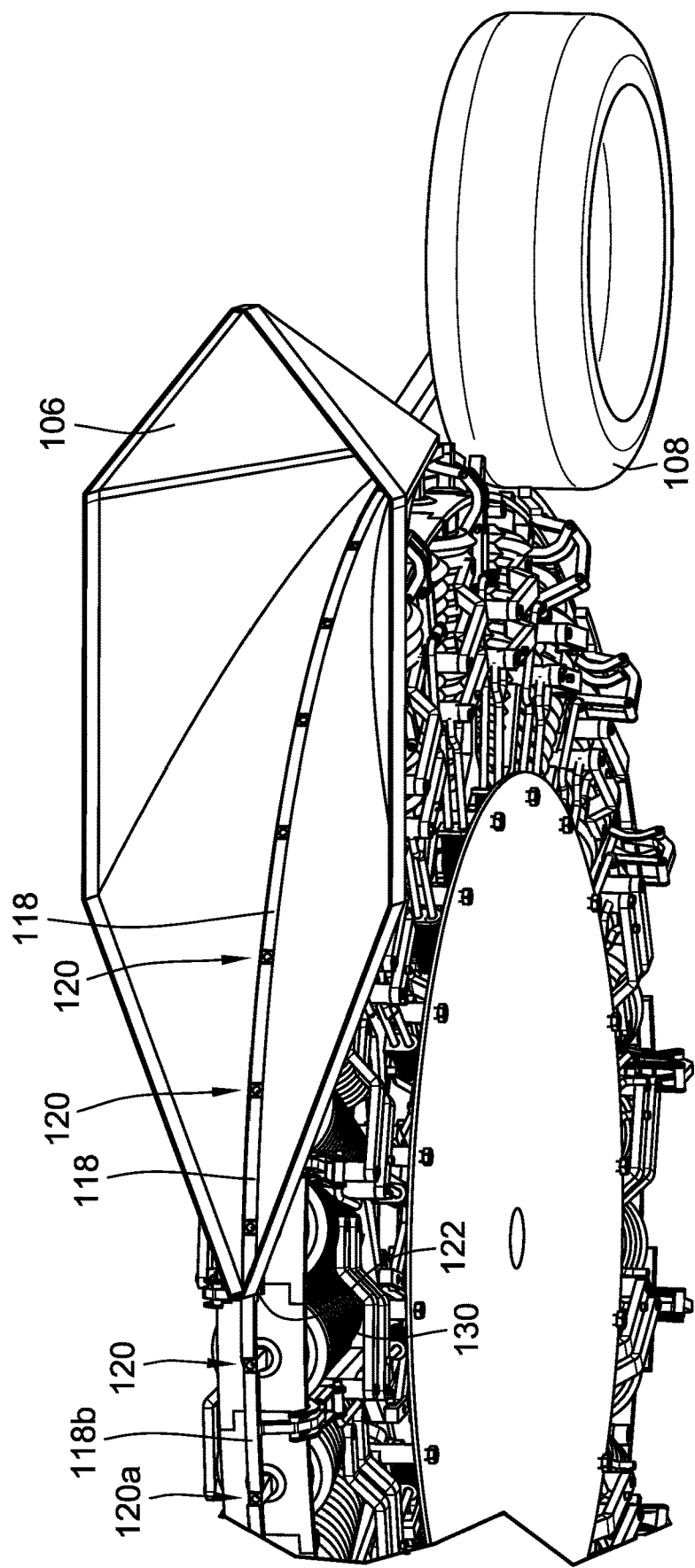
FIG. 10 illustrates a top perspective view of the agricultural seed planter of FIG. 1, according to some implementations of the present disclosure.

FIG. 10 illustrates a top perspective view of the agricultural seed planter 102 of FIG. 1, according to some implementations of the present disclosure. FIG. 10 provides a view of the inside of the seed chamber 106. The tooth fillers 118 provide a smooth continuous outer surface about the periphery of the planting wheel so that as the teeth 120 pass through the seed chamber 106, only positions available for seed to be captured are at the teeth 120. There is only one seed per tooth at a time. Negative air pressure being communicated through the teeth 120 in the seed chamber 106 attract seed and hold attracted seed to the teeth 120 until the attracted teeth is injected in the soil 104 (FIG. 1). In some implementations, a series of fingers, bars, or brushes can be provided proximate to the seed chamber 106 as the teeth 120 exit the seed chamber 106. The series of fingers, bars, or brushes can knock extra seeds off a tooth, should more than one seed become attached to the tooth.

Figure 11:
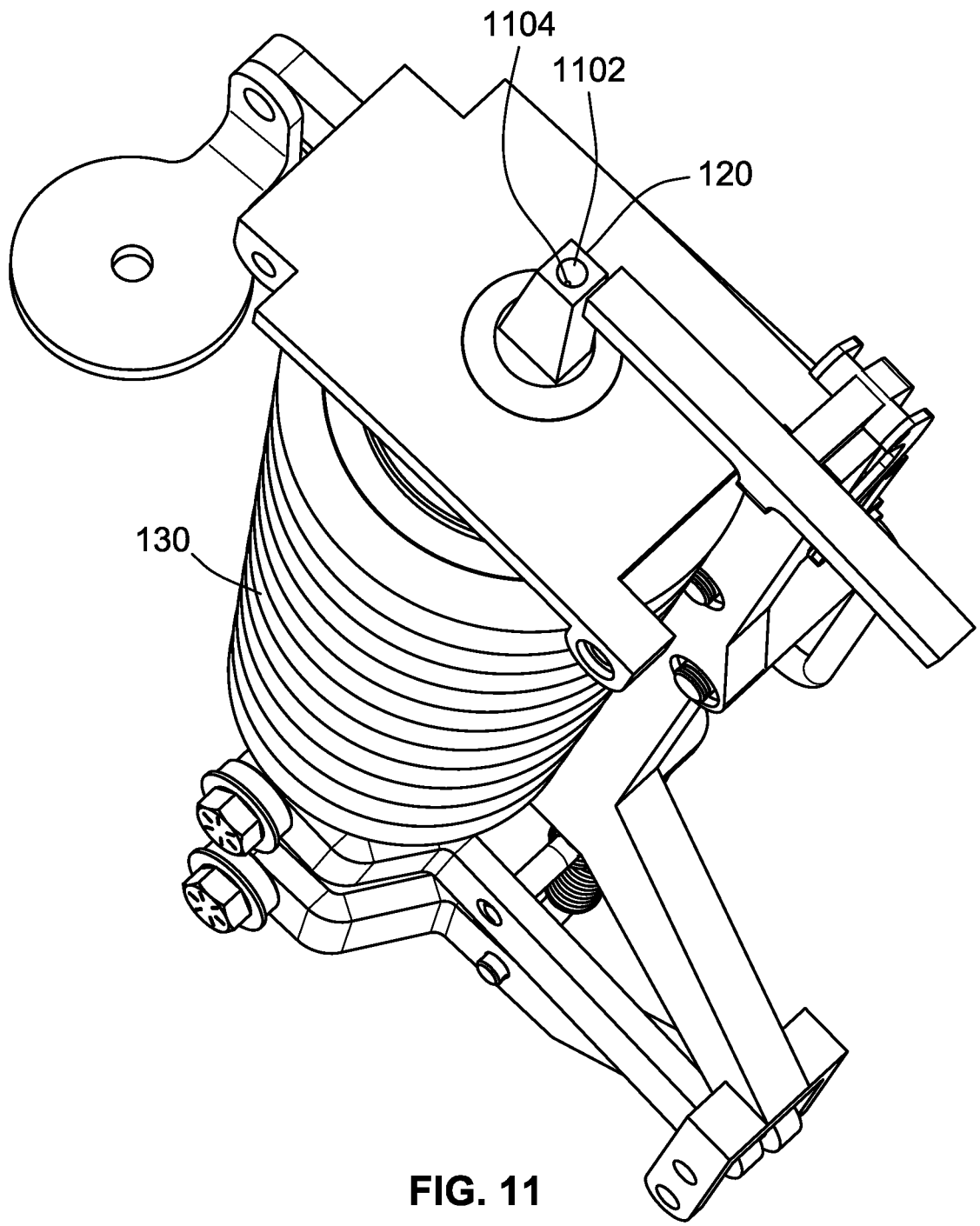
FIG. 11 illustrates a tooth on a mechanical module, according to some implementations of the present disclosure.

FIG. 11 illustrates a tooth 120 on a mechanical module 1100, according to some implementations of the present disclosure. The mechanical module 1100 is similar to or the same as the mechanical modules 416 and 418 of FIGS. 6-9. The tooth 120 has a small dimple 1102 (or recess) and an even smaller hole 1104 passing through the entire length of the tooth 120. The dimple 1102 provides a place for the seed to sit in, and the small hole 1104 allows positive or negative air pressure to be transmitted to the seed. The seed sticks to the tooth 120 because of the negative air pressure. In some implementations, the dimple 1102 is deeper than a size of the seed such that the seed is not directly compressed when the tooth 120 interfaces with the soil 104 (FIG. 1). Avoiding direct compression can reduce risk of mechanical damage to the seed as the seed is being pushed into the ground. The planting wheel 116 is formed by linking multiple mechanical modules 1100 together. In some implementations, a sensor (not shown) is coupled to each of the mechanical modules of the planting wheel 116 to determine whether the tooth of each module includes a seed. The sensor can be powered by electrical energy that is harvested from the rotation of the wheel using a dynamo generator or the like having a commutator that turns with the rotation of the wheel so that no battery or other electrical power source is required to power the sensor or any other electrical component, such as an LED light, on the seed planter 102.

Although the tooth 120 as depicted in various implementations is shown to extend orthogonally from the periphery of the planting wheel 116. In some implementations, the tooth 120 can be provided at an angle such that a radial line drawn from the center 128 (FIG. 1) of the planting wheel 116 to the tooth 120 intersects a major axis of the tooth at an angle.

Although only one agricultural seed planter is discussed herein, two or more agricultural seed planters can be joined together in parallel to plant seeds in rows. For example, the ergonomic interface of two or more agricultural seed planters can be linked together so that the different agricultural seed planters can be pulled or driven in unison to plant seeds in parallel. For example, two or three or four or five or six or seven or eight or nine or ten or eleven or twelve or thirteen or fourteen or fifteen or sixteen or seventeen or eighteen or nineteen or twenty seed planters can be linked together and moved together as a single unit to seed the same number of rows. As the number of planters increases, the moving force will increase but not linearly with each additional planter. While one or two planters can be moved by a single human, for example, when a larger number of planters are linked together, one or more draft horses or similar animals can be employed to move all of the planters down the rows on a field.

Embodiments of the present disclosure provide a purely mechanical agricultural seed planter. The mechanical agricultural seed planter has a built-in seed meter. That is, seed is injected based on separation between the teeth, and each teeth punctures the soil to a specific depth thus reducing erratic seed depths between adjacently planted seeds. The teeth allow seed to be injected into the soil without having to till the soil. Thus, the agricultural seed planter combines both functions of opening space for seed to be injected into the ground and also a spacing for seeds being planted. Thus, the agricultural seed planter itself is a seed meter. Conventional planters, on the other hand, have opener devices that are separate from meter devices.

A reason why a combined opener device-seed meter functionality is valuable is because one of the hardest problems to solve is how to get seed onto the end of a planter's tooth at high speed. Most farmers will not want to plant slower than 5 miles per hour. In recent years, the trend is to plant at higher and higher speeds, so as to plant as much of the crop as possible in as small of a window as possible when soil conditions are optimal. The beauty of making the entire opener device act as the seed meter is that having a large diameter slows down angular velocity of the individual teeth as the seed gets sucked onto the individual teeth. The slower angular velocity makes it easier to get the seed onto the end of the tooth. By being purely mechanical, agricultural seed planters, in some embodiments, free farmers of the burden of having to try to maintain the operation of complex electronic and hydraulic systems. Furthermore, a modular design of agricultural seed planters as provided herein are easier to service.

One or more elements or aspects or steps, or any portion(s) thereof, from one or more of any of claims 1-20 below can be combined with one or more elements or aspects or steps, or any portion(s) thereof, from one or more of any of the other claims 1-20 or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. An agricultural seed planter comprising:
a plurality of modules arranged around a center to form a planting wheel, each of the modules including:
a tooth for injecting a seed into the soil, the tooth including a hole passing through the length of the tooth; and
a pressure generator coupled to the tooth and configured to generate positive or negative pressure to control a position of the seed when the seed is received by the tooth;
a frame coupled to the planting wheel;
at least one gauge wheel coupled to the frame; and
a seed chamber coupled to the planting wheel,
wherein each of the plurality of modules further includes:
a retractable tooth filler configured to be in at least one of a first position or a second position, a distance between the retractable tooth filler and the tooth being smaller in the first position relative to the second position, and
wherein each retractable tooth filler of a first set of modules in the plurality of modules is positioned in the first position, and each retractable tooth filler of a second set of modules in the plurality of modules is in the second position.

2. The agricultural seed planter of claim 1, wherein the pressure generator includes a cylinder or a bellows device.

3. The agricultural seed planter of claim 1, further comprising:

a cam coupled to the frame and to the plurality of modules, the cam being configured to actuate each pressure generator of the plurality of modules to generate positive and/or negative pressure.

4. The agricultural seed planter of claim 3, wherein each pressure generator of the plurality of modules is a bellows device, wherein each bellows device is configured to expand or compress in response to being actuated by the cam.

5. The agricultural seed planter of claim 3, wherein the cam actuates each pressure generator of the plurality of modules as the planting wheel rotates.

6. The agricultural seed planter of claim 1, wherein the generated positive pressure controls the position of the seed by discharging the seed from the tooth, and wherein the generated negative pressure controls the position of the seed by causing the seed to stick to the tooth.

7. The agricultural seed planter of claim 1, wherein the generated positive pressure prevents buildup of soil in the hole of the tooth.

8. The agricultural seed planter of claim 1, further comprising:
    a sensor coupled to the plurality of modules and configured to determine whether the seed is present in the tooth.

9. The agricultural seed planter of claim 1, wherein the seed is received in a recess of the tooth.

10. The agricultural seed planter of claim 1, wherein a distance between consecutive teeth of the plurality of modules determines a separation between seeds when the seeds are injected into the soil.

11. The agricultural seed planter of claim 1, wherein the seed chamber is coupled to the the frame.

12. The agricultural seed planter of claim 1, wherein each tooth of the first set of modules is positioned in the seed chamber and each tooth in the second set of modules is positioned outside the seed chamber.

13. The agricultural seed planter of claim 11, wherein the seed chamber includes guides for creating a track where at least one tooth of the plurality of modules moves along the track as the planting wheel rotates.

14. The agricultural seed planter of claim 1, further comprising:
    a cam coupled to the frame and to the plurality of modules, the cam being configured to actuate each retractable tooth filler in the plurality of modules to be placed in the first position or the second position.

15. The agricultural seed planter of claim 1, wherein the at least one gauge wheel elevates the frame such that a depth of injection of seed into the soil is based at least in part on an elevated distance of the frame.

16. The agricultural seed planter of claim 1, wherein the at least one gauge wheel reduces a weight of the planting wheel on the soil.

17. An agricultural planter comprising:
    a plurality of agricultural seed planters, wherein a respective agricultural seed planter in the plurality of agricultural seed planters includes discrete teeth arranged on a periphery of the respective agricultural seed planter and a retractable tooth filler between a pair of adjacent ones of the discrete teeth, each of the discrete teeth having a hole passing through the tooth for communicating fluid pressure through the tooth, the retractable tooth filler being configured to be in at least one of a first position and a second position, a distance between the retractable tooth filler and one of the adjacent ones of the discrete teeth being smaller in the first position relative to the second position.

* * * * *